Feb. 24, 1953     N. F. TOADVINE     2,629,396
POULTRY WATERER REGULATING VALVE
Filed Aug. 26, 1949
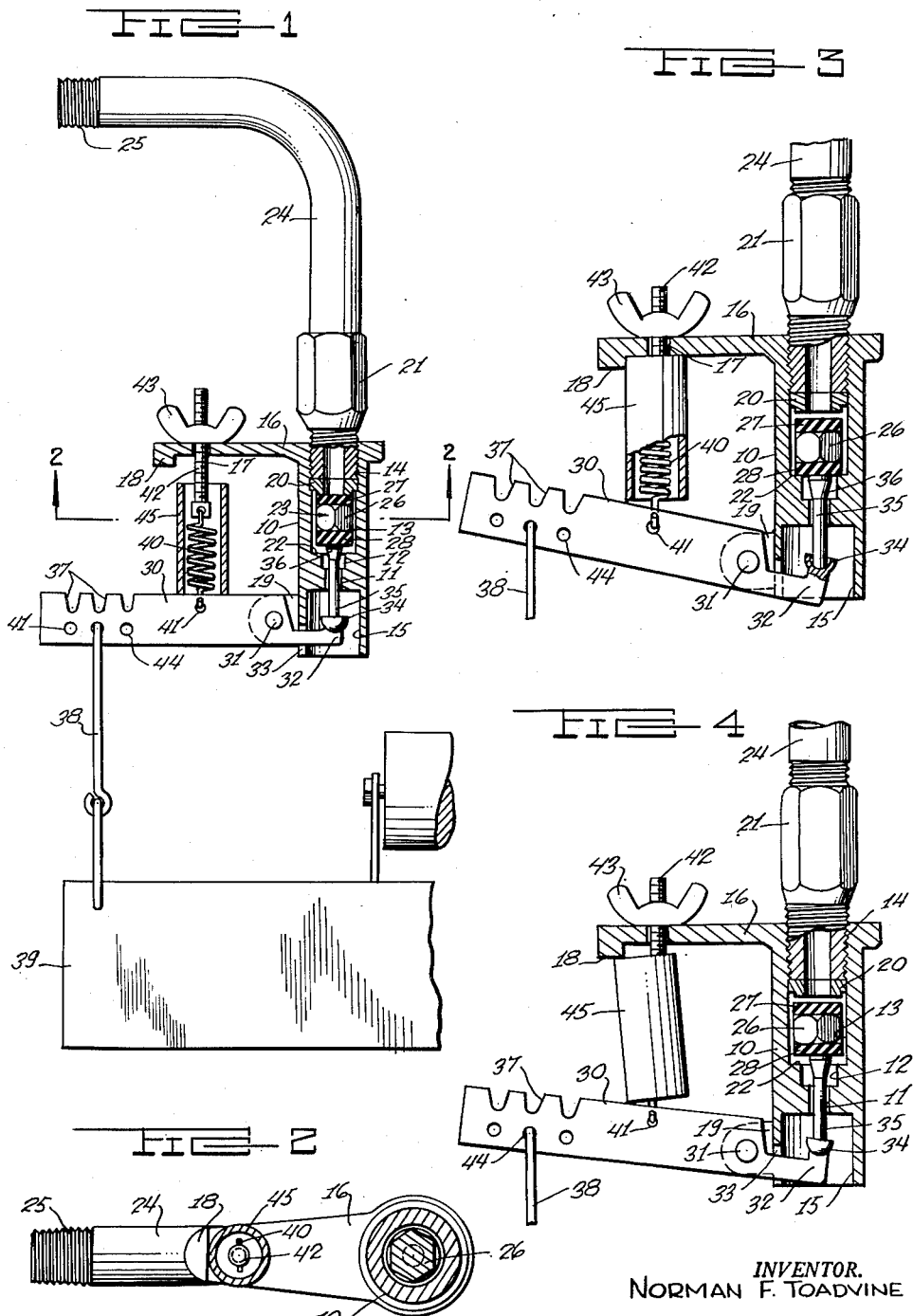
INVENTOR.
NORMAN F. TOADVINE
BY
ATTORNEYS Patented Feb. 24, 1953

2,629,396

UNITED STATES PATENT OFFICE 2,629,396

POULTRY WATERER REGULATING VALVE

Norman F. Toadvine, Salisbury, Md.

Application August 26, 1949, Serial No. 112,531

2 Claims. (Cl. 137—408)

This invention relates to automatic valves and more particularly to an automatic regulating valve for a poultry waterer, the present application being a continuation in part of my application Serial No. 104,183, filed July 12, 1949, for Automatic Water Valve, now Patent Number 2,541,622, patented February 13, 1951.

It is among the objects of the present invention to provide an improved, automatic valve of simplified construction which is operative to suspend a watering pan or trough and to cut off the flow of water therethrough when the pan is filled and also when the pan is empty or removed from the valve, and which includes a simplified controller which can be manually set to preclude closing of the valve in one direction and is releasable by gravity when a predetermined weight of water is in a pan suspended from said valve to free the valve for closing in both directions, which controller is provided by a short section of standard metal stock and requires no special machining operation thereby substantially reducing the cost of manufacture of the valve, and which valve is durable in construction, positive in action, not subject to malfunctioning in use, extremely economical to manufacture, and is easy to install and use.

Other objects and advantages will become apparent from a consideration of the following description and the appended claims in conjunction with the accompanying drawing wherein:

Figure 1 is a side elevation of an automatic, water-control valve illustrative of the invention, portions being broken away and shown in cross section to better illustrate the construction thereof;

Figure 2 is a transverse cross section on the line 2—2 of Figure 1;

Figure 3 is a view similar to Figure 1 but showing the valve parts in a different operative position from that illustrated in Figure 1; and Figure 4 is a view similar to Figures 1 and 3 but showing the valve parts in a still different operative position of that illustrated in Figures 1 and 3.

With continued reference to the drawing, the improved valve has an elongated valve body 10 which may be of circular or polygonal cross sectional shape and which includes a longitudinal bore comprising a restricted portion 11 intermediate the length of the body, a small diameter counter-bore 12 at one end of the restriction 11, a counter-bore 13 of medium diameter extending from the end of counter-bore 12 opposite the restriction 11 to the adjacent end of the body 10 and provided near such end of the body with screw threads 14, and a counter-bore 15 of large diameter extending from the end of restriction 11 opposite the small counter-bore 12 to the end of the body 10 opposite that to which the counter-bore 13 extends.

An arm 16 extends substantially perpendicularly from the valve body 10 at the end of the valve body to which the counterbore 13 opens and this arm is provided with an aperture 17 at a location spaced from the valve body. A projection 18 is provided on the arm 16 at the outer end thereof and on the side thereof adjacent the end of the body 10 in which the large counter-bore 15 is provided. An apertured lug 19 extends outwardly from the body 10 at the end of the body opposite that from which the arm 16 projects and this lug is disposed in alignment with the arm 16 longitudinally of the body 10.

A valve seat 20 is secured in the counter-bore 13 at a location spaced from the small counter-bore 12 by the externally screw-threaded stem of a pipe fitting 21 which is threaded into the screw-threaded portion of the counter-bore 13. The annular shoulder 22 surrounding the end of the counter-bore 12 opening into the counter-bore 13 provides a second valve seat opposed to the valve seat 20 and a valve piston, generally indicated at 23, is disposed in the counter-bore 13 between the valve seats 20 and 22, this piston being shorter than the space between the opposed valve seats so that the piston may move into alternative engagement with either one of the valve seats to close the valve or may occupy a position between the two valve seats in which position of the piston the valve is open.

A conduit 24 for water under pressure is connected at one end to the fittings 21 and is provided at its opposite ends with screw-threads 25 for connection of the conduit to a water main.

The valve piston 23 comprises a spacer 26, preferably formed of metal and of polygonal cross sectional shape to provide adequate space for the flow of water between this spacer and the wall of the counter-bore 13, and two circular discs or washers 27 and 28 of resilient material, such as rubber, disposed in the counter-bore 13 at respectively opposite sides of the spacer 23 and respectively engageable with the valve seats 20 and 22.

A lever 30 is pivotally connected near one end to the lug 19 by a pivot pin 31 and has a finger 32 which extends through a notch 33 in the wall of the valve body surounding the counter-bore 15 into the large counter-bore 15. This finger carries a cup formation 34 on its end and a valve operating pin 35 has one end received in this cup formation and has on its opposite end a flat head 36 which bears against the disc 28 to raise the valve piston 23 away from the seat 22 and against the seat 20.

Opposite the pivot pin 31 from the finger 32 the lever 30 is provided with a series of spaced-apart notches 37 adapted to receive a bail 38 for suspending one end of a poultry watering trough 39 from the lever.

A tension spring 40 is connected at one end to the lever 30 by having a hook on its end passed through an aperture 41 in the lever and is connected at its opposite end to an externally screw-threaded pin 42 which extends through the aperture 17 and receives a wing nut 43 thereon which wing nut is threaded onto the pin 42 and bears against the side of arm 16 opposite lever 30.

With the exception of the projection 18 on arm 16, the above-described valve mechanism is fully disclosed in my copending application, referred to above, and constitutes no part of the present invention except in the combination thereof with the improved valve controller.

In operation, the valve is secured to the water main so that the valve is in substantially vertical position with the arm 16 directly above the lever 30. When there is a predetermined weight of water in the pan or trough 39 suspended from the lever 30, this weight pulls the lever 30 down against the force of spring 40 and the lever, through the intermediacy of pin 35, forces the valve piston 23 upwardly into closing relationship with the valve seat 20 thereby cutting off the flow of water through the valve to the trough 39. When some of the water has been used from the trough the spring 40 pulls the lever up permitting the valve piston to move away from the valve seat 20 so that additional water will flow into the trough. The cylindrical skirt surrounding the large bore 15 provides a guide for the water flowing from the valve so that the water is deflected downwardly into the trough and is not spread over the area adjacent the trough while the cup 34 on the finger 32 breaks up the flow of water so that it is not driven downwardly into the trough at high velocity to produce spattering.

If the trough is accidentally or intentionally removed from the lever 30, for example, to clean the trough, the spring 40 pulls the lever 30 up until the valve piston descends into engagement with valve seat 22 thereby cutting off the flow of water through the valve while the trough is removed to prevent flooding of the area adjacent the valve.

The amount of water in the trough 39 required to close the valve can be regulated by adjustably threading the wing nut 43 on the stem or pin 42.

When a trough has been emptied and cleaned and is placed back on the lever 30 either by engagement of the bail 38 in one of the notches 37 or in one of the apertures 44 alternatively provided to receive the bail, the spring 40 will hold the valve closed and water will not flow through the valve into the empty trough. The attendant could, of course, hold the lever 30 down until sufficient water had flowed into the trough to operate the valve but, as this would be a troublesome and time-consuming operation, special means have been provided to hold the valve open automatically until sufficient water has been supplied to the trough to operate the valve and to then release the valve for closing operation in either direction.

This special controller for holding the valve open while the empty trough is being filled comprises a short length of standard stock metal tubing, as indicated at 45. This controller may be formed of any suitable, corrosion resisting metal, such as brass and a piece of standard one-half or five-eighths inch diameter brass tubing approximately one and three-quarters inches long has been found to provide highly satisfactory results in use. The piece of tubing is simply cut off square at its ends and requires no special machining operations so that it is extremely economical to provide and materially reduces the total cost of manufacturing the valve.

The tubular controller has an internal diameter such that it loosely receives the coiled tension spring 40 and a portion of the screw-threaded stem 42. When it is desired to hold the valve open this controller is manually moved so that, with its lower end resting on the top edge of lever 30 its top edge engages under the downwardly extending projection 18 at the outer end of arm 16 so that the spring cannot pull the lever toward the arm 16 a distance sufficient to permit the valve piston 23 to contact the lower valve seat 22. With the controller in this position, as particularly illustrated in Figure 4, the valve is held open and water will flow through the valve into the empty pan 39. As soon as a predetermined quantity of water has passed through the valve into the pan, the weight of this water will pull the lever 30 down, raising the valve piston to closing contact with the upper valve seat 20, as is clearly illustrated in Figure 1. If the pan is now accidentally or intentionally disconnected from the lever 30 the spring 40 will raise the lever so that the valve piston will contact the lower valve seat 22, as particularly illustrated in Figure 3, cutting off the flow of water through the valve.

With the valve held open by the controller 45, as illustrated in Figure 4, as soon as the lever 30 is moved downwardly by the weight of water in trough 39, the force of gravity, acting on the controller will move its upper end away from the projection 18 to the position illustrated in Figures 1 and 3 so that the controller no longer effects the operation of the valve.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. An automatic valve comprising an elongated valve body having a bore extending longitudinally therethrough, means at one end of said bore for securing an end of a water conduit to said body, said body providing a discharge opening at the opposite end of said bore, spaced apart valve seats in said bore in mutually opposed relationship, a valve piston in said bore between said valve seats and operative to close with either one of said valve seats to interrupt flow of water through said valve, an arm projecting substantially perpendicular from said body at said one end of said bore, an apertured lug projecting outwardly from said body at the opposite end of said bore, a pan suspending lever pivotally connected to said lug and having at one end a finger extending into said valve body, means interposed between said finger and said valve piston for moving said piston against one of said valve seats when said lever is swung away from said arm by the weight of water in a pan suspended from said lever, a spring connected between said lever and said arm for moving said lever towards said arm to permit engagement of said piston with the other of said valve seats when less than a predetermined weight is suspended from said arm, a projection on said arm at the end thereof remote from said valve body, and a tubular body surrounding said spring and manually tiltable into engagement with said projection to hold said lever in position to maintain said valve piston between said valve seats and hold said valve open, said tubular body being released by gravity from said projection when said lever is moved against the force of said spring by a predetermined weight of water in a pan suspended from said lever.

2. In an automatic valve for controlling the supply of water to a watering trough and having a valve operating, trough suspending lever operative to close said valve in one direction by suspension of a predetermined weight therefrom, an arm disposed above said lever, and a tension spring connected between said lever and said arm to close said valve in the opposite direction when said lever is substantially free of suspended weight, means for maintaining said valve open against the force of said spring comprising a projection on the side of said arm adjacent said lever, and an elongated tubular body surrounding the valve spring and bearing at its lower end on said lever, said body being manually tiltable to engage its upper end under said projection while said lever is held in valve opening position against the force of said spring and being movable out of engagement with said projection by gravity when said lever is moved downwardly against the force of said spring by a predetermined weight suspended from the lever.

NORMAN F. TOADVINE.

REFERENCES CITED

The following references are of record in the file of this patent:

UNITED STATES PATENTS

| Number | Name | Date |
|---|---|---|
| 281,236 | Brunck | July 17, 1883 |
| 2,512,839 | Pruitt | June 27, 1950 |